J. T. DUFF.
VEHICLE WHEEL.
APPLICATION FILED APR. 6, 1915. RENEWED SEPT. 17, 1917.
1,264,623.
Patented Apr. 30, 1918.
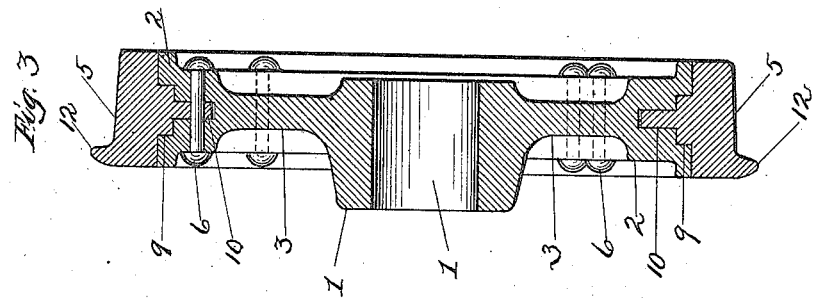
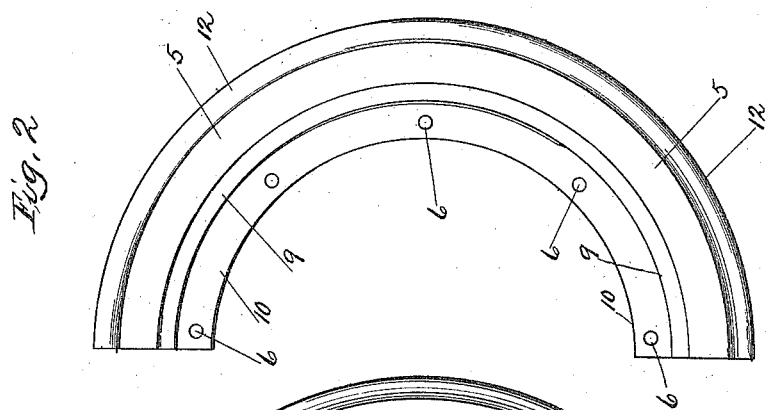
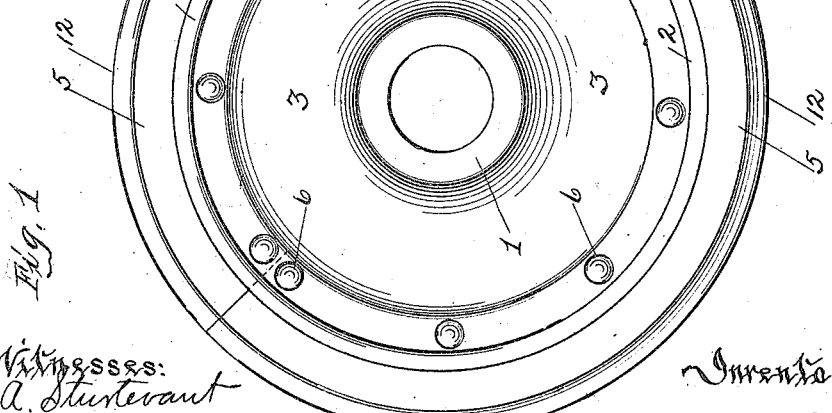

UNITED STATES PATENT OFFICE.

JOHN T. DUFF, OF PITTSBURGH, PENNSYLVANIA.

VEHICLE-WHEEL.

1,264,623.

Specification of Letters Patent.

Patented Apr. 30, 1918.

Application filed April 6, 1915, Serial No. 19,427. Renewed September 17, 1917. Serial No. 191,898.

*To all whom it may concern:*

Be it known that I, JOHN T. DUFF, a citizen of the United States, residing at Pittsburgh, in the county of Allegheny and State of Pennsylvania, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle-wheels, and more especially to wheels for cars and the like, although the invention is not limited thereto, but may be applied to any vehicle wheel.

The object of the invention is to provide a vehicle-wheel having a tread portion separate from the body thereof and so secured thereto that it can be easily removed and replaced in order that said tread portion can be renewed whenever damaged or worn.

The tread portion of vehicle-wheels is subjected to exceedingly hard wear, this portion of the wheel being the one which usually wears out first. Moreover, with certain vehicles, such as street-cars, the application of the brakes is liable to cause the wheel to slide or skid on the rails, this wears off the tread and produces what is known as "flat" wheels. Such wheels are very objectionable, not only making the cars uncomfortable to ride in, but also causing the car-body and track to become racked. To overcome such flattened wheels, the practice heretofore is to take the wheels from under the car and subject the same to a grinding or turning operation to again true the same. This is a slow expensive procedure and also makes it impossible to use the car while this is going on. Another difficulty is that the repeated grinding of the wheel reduces the diameter thereof, so that the wheels are not all the same size, thus causing the truck to become askew. Some car wheels are made in chilled molds, which give a hardened tread. The grinding of the tread to remove the flattened portion removes the hard chilled surface, so that softer metal is exposed and the liability of flattening is aggravated.

By my invention all the foregoing difficulties are avoided.

This invention consists, generally stated, in providing a vehicle-wheel with a tread portion which is separate from the body, so that it can be made of very hard tough material and which is so secured to the body that it can be easily removed or replaced. When the tread portion becomes worn or flattened, it is only necessary to cut off the heads of the rivets, drive the same out of place and replace the worn portion by a perfect one. This operation requires very little time, involves little expense, and the car is not put out of use for any appreciable length of time.

The renewable tread can be formed of hard tempered steel, so that its wearing qualities are much greater than a chilled wheel, and as a consequence the flattening thereof is largely avoided.

In the accompanying drawings;—

Figure 1 is a side view of my car-wheel.

Fig. 2 is a side view of one of the tread-sections detached from the wheel; and

Fig. 3 is a vertical section through the center of the wheel.

My vehicle-wheel will comprise a body adapted for attachment to a shaft or axle and which will have a hub and rim portion connected in any suitable way, either by spokes or a web. This body may be cast or formed of wrought metal, as preferred. In the drawing the invention is shown as applied to an ordinary webbed car-wheel having a body comprising a hub portion 1, a rim portion 2, and the web 3, this body preferably being formed by casting. The tread is separate from the body portion and is formed in two or more sections, two such sections being shown. This is for the purpose of permitting the easy manufacture of said rim portion and its ready attachment to and removal from the body portion. These tires or tread sections will be attached to the body portion by rivets 6, passing through matching undercut grooves on the outer face of the body portion and inner ribs 10, of the tread-sections. Any suitable number of such rivets may be used, the drawings show ten; but this number obviously can be increased or diminished, according to the weight of the wheel and the use to which it is subjected. In order to keep the tread portion from slipping sidewise off the body portion, said tread and body are provided with a coöperating projection 9, and corresponding depression, said depression being an annular groove about the rim-face, and as a holding means a further rib 10 is formed with the tread portion, which enters a corresponding depression in the rim of the wheel. These two depressions form a shouldered groove, T shaped in cross section, as will be best seen at Fig. 3, of the drawings.

The tread face will be varied according to the character of the vehicle-wheel. When used as a car-wheel, as shown in the drawings, it will be provided with the usual tread-face 5, and flange 12. For other forms of vehicles it may be flat or concave or convex, as desired.

The tread section will be formed from a hard durable metal, preferably of steel. The section can be made either by casting or by rolling a bar of the desired contour in cross-section, cutting said bar into suitable lengths, and then by means of a press or the like bending said section into semi-circular shape to form the two sections of the tread. These tread-sections, after being bent to shape, can be tempered and hardened, so that they are exceedingly durable and will not readily wear away or become flattened even though the wheel should slip on the track.

A wheel constructed according to my invention can be used for a much longer time before flattening than wheels now in use. When the tread portion becomes worn or damaged from any cause, it can be renewed by simply cutting off the heads of the rivets on one side of the wheel, removing said rivets and replacing the worn section by a perfect one. The damaged section may be, if desired faced down and then again tempered and hardened for future use, or, if seriously damaged they can be melted down and again cast or rolled to the desired form.

By this construction of a car-wheel and more especially that of the holding means to prevent sidewise and peripheral movement, the strongest possible combination is formed.

What I claim is;—

1. A tire for vehicle wheels comprising a tread portion formed in sections, each section having a shouldered inner peripheral web of varying thickness, said web having its greatest thickness at its junction with the tread portion, and provided with bolt or rivet openings through its thin or inner portion.

2. A vehicle-wheel comprising a tire formed in sections having a shouldered inner peripheral web of varying thickness, said peripheral web having its greatest thickness at its junction with the tread portion, and provided with bolt or rivet openings through its thin or inner portion, in combination with an integral center grooved to fit the tire, and openings registering with those of the inner web of the tire sections.

In testimony whereof, I affix my signature, in presence of two witnesses.

JOHN T. DUFF.

Witnesses:
 IDA A. STURTEVANT,
 HUGH B. DUFF.

Copies of this patent may be obtained for five cents each, by addressing the "Commissioner of Patents, Washington, D. C."